(12) United States Patent
Kelly

(10) Patent No.: US 8,234,231 B2
(45) Date of Patent: Jul. 31, 2012

(54) AUTOMATED DECISION-MAKING BASED ON COLLABORATIVE USER INPUT

(76) Inventor: Patrick Laughlin Kelly, Stanford, CA (US)

( * ) Notice: Subject to any disclaimer, the term of this patent is extended or adjusted under 35 U.S.C. 154(b) by 1091 days.

(21) Appl. No.: 12/041,789

(22) Filed: Mar. 4, 2008

(65) Prior Publication Data

US 2009/0063379 A1    Mar. 5, 2009

Related U.S. Application Data

(60) Provisional application No. 60/905,264, filed on Mar. 6, 2007.

(51) Int. Cl.
*G06F 17/00* (2006.01)
*G06N 5/02* (2006.01)
(52) U.S. Cl. ............................... 706/46; 702/19; 434/36
(58) Field of Classification Search ............... 706/46
See application file for complete search history.

(56) References Cited

U.S. PATENT DOCUMENTS

| | | | |
|---|---|---|---|
| 6,070,149 A | 5/2000 | Tavor et al. | |
| 7,036,090 B1 | 4/2006 | Nguyen | |
| 2006/0078867 A1 | 4/2006 | Penny et al. | |
| 2006/0286537 A1* | 12/2006 | Mandella et al. | 434/350 |
| 2007/0011185 A1* | 1/2007 | John | 707/102 |
| 2007/0231780 A1* | 10/2007 | Shulman | 434/350 |
| 2008/0134053 A1 | 6/2008 | Fischer | |

OTHER PUBLICATIONS

"PhDs.org: Find the Graduate School That's Right for You", retrieved from http://graduate-school.phds.org on Jul. 15, 2008, p. 1-35.

* cited by examiner

*Primary Examiner* — Kakali Chaki
*Assistant Examiner* — Kalpana Bharadwaj
(74) *Attorney, Agent, or Firm* — Raubvogel Law Office

(57) ABSTRACT

A system and method solicit decision-making input from a large number of users in a structured manner that facilitates generation of useful recommendations. The individual seeking advice posts a request for advice in the form of a decision question, or identifies a previously posted decision question. Visitors to the website can post secondary questions that are intended to assist the advice-seeker in making the decision. For each secondary question, the user posting the question can specify which choice for the decision question is recommended by each answer to the secondary question. The user can also specify a strength for the recommendation. The advice-seeker then inputs answers to the secondary questions. The advice-seeker can indicate a relative significance value for some or all of the answers. For each secondary answer, a score is generated. Scores are totaled and the results are provided to the advice-seeker to assist in decision-making.

28 Claims, 12 Drawing Sheets logout *hola*

Pending Questions
Should I go to Stanford or UCSC?
Should I have some chocolate ice cream or peppermint streudel?
Is drastic a good synonym for dramatic or not?
Should I go to Silverton or Ouray?
Should we hike at high altitude or low altitude?
Should I study astro or theory?
Should I buy an Apple or IBM?
Should we buy a bear canister or not?
Should I go to the zoo or canoeing?
Should I have my picture taken at a housing project or at home?
Should Jen get a Prius or an old Passat?
Should I get a dog or seal?
Should I stay in my lab or find another?
Should I go to Buck's or McDonald's?
What is better birch beer or root beer?
Should I climb Denali or Kilimanjaro?
Should I pick up whale parts I find on the beach or not?
Should I drive a bmw or Benz?
Should I retire or not?
Should I go to Cafe Abir or Cafe Mojo?

} 301

300

Post Your Own Question!

302  303  or  303  ?

e.g. Should I vote   e.g. Democrat   Post   e.g. Republican
                                304

*FIG. 3A*

AUTOMATED DECISION-MAKING BASED ON COLLABORATIVE USER INPUT

CROSS-REFERENCE TO RELATED APPLICATION

The present patent application claims priority from U.S. Provisional Patent Application Ser. No. 60/905,264, filed Mar. 6, 2007, for "Method of Generating Decision Processes Using Input From Users", which is incorporated herein by reference.

FIELD OF THE INVENTION

The present invention relates to automated decision-making, and more particularly to systems and methods for obtaining input from users to assist in decision-making.

DESCRIPTION OF THE RELATED ART

In making decisions, it is often useful to solicit and obtain the opinions of others. Many people seek advice from several people before making a decision, particularly when the decision involves an important or expensive choice, or when the decision is irrevocable once made. For example, someone who is considering buying a new car may ask for advice from several people they know, particularly from those who have bought a car that the person is considering.

Individuals often find it difficult to obtain enough information to feel confident about their decision. They may not know enough people who have expertise in the required area, or they may not have the time to ask enough people, or they may not want to burden others with their questions. Online resources, such as forums and newsgroups, are available, but it may be difficult to get useful, practical advice from such sources because of their unstructured nature; such sources usually provide no clear paradigm for providing advice regarding a decision that has a fixed number of options. It may also be time consuming to locate a relevant online forum and to sift through a large number of postings to find those that appear to be relevant, and then to aggregate the information in the postings so as to extract useful advice.

In addition, advice and guidance from such sources often ignore the particular preferences and needs of the individual seeking the advice. For example, a compact car might be suitable for a single student, but might not be suitable for a large family with four children. Many sources of information do not adequately take into account individual preferences and needs, so that the advice they provide may not apply to the individual making the decision.

What is needed is a system and method for soliciting and obtaining advice from a large number of users in a systematic and structured way that aggregates the advice to generate useful recommendations. What is further needed is a system and method that simplifies the process of providing and obtaining such advice. What is further needed is a system and method that takes into account the preferences and needs of the person seeking the advice. What is further needed is a system and method for obtaining recommendations while avoiding the limitations of the prior art.

SUMMARY OF THE INVENTION

The present invention provides techniques for soliciting decision-making input from a large number of users in a structured manner that facilitates generation of useful recommendations.

The individual seeking advice posts a request for advice in the form of a decision question, or identifies a previously posted decision question. For example, the individual might ask, "Should I go to UC Santa Cruz?" or "Should I go to Stanford or UC Santa Cruz?" If the advice-seeker has posted a new decision question, visitors to the website (referred to herein as "users") can then post secondary questions that are intended to assist the advice-seeker in making the decision. For example, one such secondary question might be, "Do you like counterculture?" In one embodiment, secondary questions appear on the website only after the advice-seeker (or some other moderator) approves them; in another embodiment, submitted questions appear on the website without any requirement that they be approved.

For each secondary question, the user posting the question can specify which decision question choice is recommended by each answer to the secondary question. For example, the user posting the question "Do you like counterculture?" might recommend UC Santa Cruz to an advice-seeker who answers this question affirmatively while recommending Stanford for a negative answer. Optionally, the user can also specify a strength for the recommendation; in general, a higher strength of the recommendation will give a secondary question greater bearing (in one direction or the other) on the answer to the decision question. The recommendation strength can be specified, for example, as a numeric value along a scale.

Recommendation strengths can be specified by the user posting the secondary questions, or they can be specified by another user, by the advice-seeker, or by a moderator. In one embodiment, other users can rate and/or edit posted questions, and/or change the recommendation strengths assigned to questions. In one embodiment, recommendation strengths are inferred, for example by calculating an average of different recommendations submitted by users in response to a single secondary question or a weighted average taking into account the credibility (perhaps based on feedback) of the user submitting the recommendations.

The secondary questions provide a mechanism by which the advice-seeker can deconstruct the task of arriving at an answer to the decision question. Ideally, the secondary questions are straightforward and can be easily answered by the advice-seeker, while providing useful guidance as to the decision question.

The advice-seeker inputs answers to the secondary questions. Optionally, the advice-seeker can indicate a relative significance value for some or all of the answers. For each secondary answer, a score is generated based on a) one or more recommendation strengths associated with the secondary question, and b) the indicated relative significance value of the secondary answer, if provided. In one embodiment, the score is the product of numeric indicators for a) and b). The scores for the two (or more) available answers to the decision question are totaled, and the results are provided to the advice-seeker. The higher-scoring choice to the decision question is indicated as recommended. The results may also be posted publicly so that they are made available to other users as well.

In one embodiment, users can view previously-asked decision questions, submit their own answers to these previously-asked questions, and view recommendations based on those answers.

BRIEF DESCRIPTION OF THE DRAWINGS

The accompanying drawings illustrate several embodiments of the invention and, together with the description.

FIG. 3A depicts a sample layout for a screen for selecting or posting a decision question, according to one embodiment.

DETAILED DESCRIPTION OF THE EMBODIMENTS

System Architecture

Figure 1:
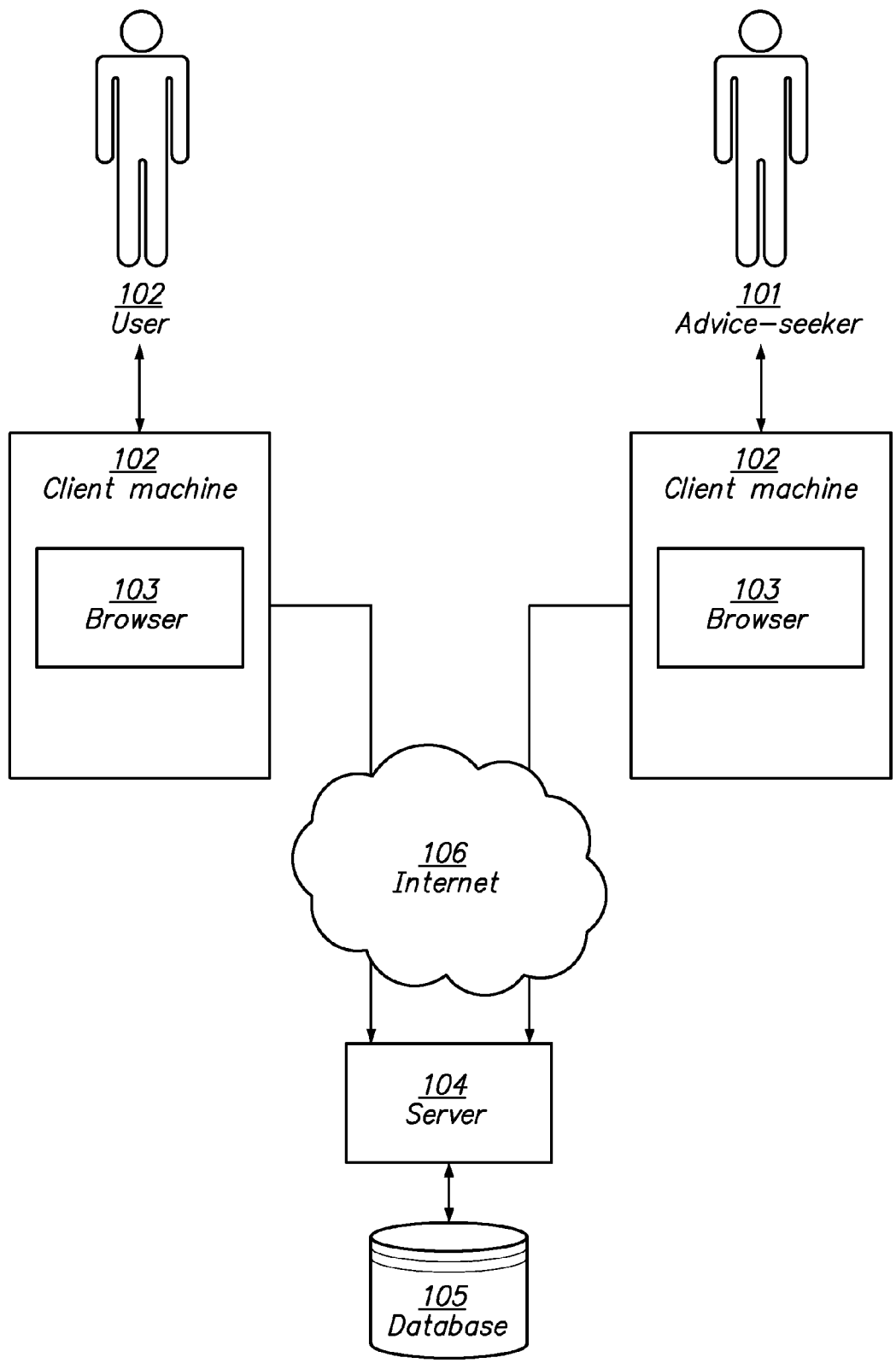
FIG. 1 is a block diagram depicting an architecture for practicing the present invention according to one embodiment.

Referring now to FIG. 1, there is shown a block diagram depicting an architecture for practicing the present invention according to one embodiment. In one embodiment, the invention is implemented in a client/server environment, wherein some components are implemented in a central server 104, while the advice-seeker 101 and users 102 interact with the system via client machines 102 running software such as a web browser 103. Client machines 102 may communicate with server 104 according to any known networking paradigm, including for example TCP/IP communication over the Internet 106. A database 105 is provided for storing working data such as questions, responses, and the like.

In one embodiment, the client-side aspects of the present invention are implemented using Asynchronous JavaScript and XML (AJAX), which allow for improved responsiveness in user interaction.

In other embodiments, users 102 and advice-seekers 101 interact with the system via other means, such as by kiosks, cell phones, a voice-activated telephone interface, or the like. In other embodiments, the invention can be implemented as a stand-alone system, where no communication with outside components is needed.

Method of Operation

Figure 2:
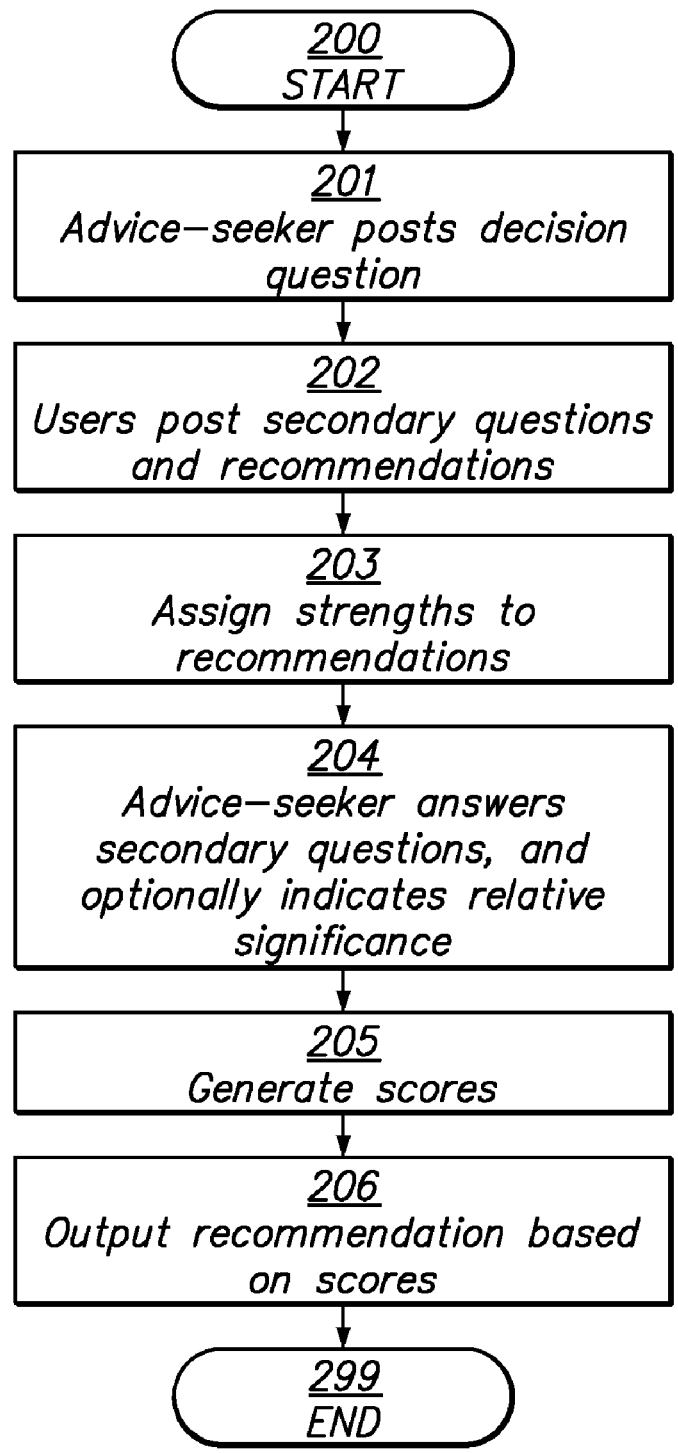
FIG. 2 is a flowchart depicting a method of practicing the present invention according to one embodiment.

Referring now to FIG. 2, there is shown a method of practicing the present invention according to one embodiment. An advice-seeker 101 is looking for assistance in making a decision. The advice-seeker 101 posts 201 a decision question, for example by entering text in a set of input fields on a web page. In one embodiment, the present invention is implemented via a web page that provides a mechanism for structured entry of a decision question. For illustrative purposes, the decision question is assumed to have two possible choices, although the invention can accommodate decision questions having any number of possible choices, as described in more detail below.

In one embodiment, prior to the advice-seeker 101 posting a decision question, he or she can browse a list of previously posted questions and/or enter a search query to find previously posted questions on a particular topic.

In one embodiment, natural language processing is performed on an entered search query so as to identify previously posted decision questions that are in some way related to the subject matter for which the advice-seeker 101 wants assistance. This can be accomplished through keyword matching, natural language algorithm, or the like. If a matching decision question has been posted previously, the system can present the previously posted question(s) to the advice-seeker 101 so as to allow the advice-seeker 101 to review associated secondary questions and obtain advice with respect to the previously posted question(s). The advice-seeker 101 can be prompted to provide input as to whether the previously posted question(s) is a good match to the query posted by the advice-seeker 101. Such a record of verification can be retained for use in future search queries.

If the advice-seeker 101 is not able to find a previously posted decision question that is on point, he or she can enter a new decision question. The decision question can be entered in a structured fashion, with separate input fields for each component of the question. Alternatively, the advice-seeker 101 can enter the question in a text field, and the system can use natural language processing to identify the preamble and the two (or more) choices specified in the question.

Once it has been parsed, the decision question is stored in the database 105.

Subsequently, other users 102 can view the decision question and post 202 secondary questions. The advice-seeker 101 can specify whether the decision question is viewable by anyone, or by a select group of individuals. For example, in one embodiment, the advice-seeker 101 may seek advice from a select group of friends, family or other contacts; thus, the decision question might be made available only to members of the select group. The group may be an arbitrary group, or it may be defined as those that have been granted access to the advice-seeker's 101 page on a social networking website such as Facebook.

In an embodiment where the decision question is viewable only by a select group of individuals, an email message or other communication can automatically be sent to those whose advice is sought. The email message can contain a link to the decision question at its posted location, and/or it might contain login authentication credentials enabling the recipient to access the posting, view the decision question, and provide advice.

In one embodiment, each secondary question includes two or more selectable answers. The user 102 indicates which decision question choice is recommended for each selectable answer to a secondary question. For example, the user 102 might post the secondary question, "Do you like counterculture?" and indicate that UCSC is recommended for an affirmative answer, while Stanford is recommended for a negative answer.

Optionally, the user 102 can specify the strength of the recommendation along some numeric scale, such as for example 1 through 3. Thus, the user 102 might indicate, for the example given above, that the strength of the recommendation is 2. In one embodiment, a default recommendation strength can be suggested, based for example on typical entries by other users 102.

In one embodiment, users 102 can enter a secondary question in a text field, and natural language processing is performed to parse the question and identify its various components. The secondary question can be reformatted so that it will be presented with correct grammar and in correct syntax. In addition, in one embodiment, submitted secondary questions are analyzed to identify those that are similar to previously entered secondary questions. Thus, unwanted duplication of secondary questions can be avoided.

In one embodiment, recommendations and strengths can be edited by other users 102. Users 102 can view previously posted secondary questions, and can edit recommendations and strengths or contribute their own recommendations and strengths for the posted questions. In one embodiment, a moderator can adjust recommendations and strengths based on user 102 feedback. In another embodiment, feedback from various users 102 is aggregated to generate adjustments to recommendations and strengths. In yet another embodiment, a user 102 can indicate that he or she has particular expertise in a particular subject, so that his or her recommendations are given greater weight than they otherwise would be. If appropriate, credentials or other authentication mechanisms may be provided to validate the assertion of expertise.

In yet another embodiment, recommendation strength can be adjusted based on the number of other users 102 that indicate agreement with the posted recommendation, or on the number of other users 102 that elected to use the posted recommendation. Users 102 can be polled for their opinions as to posted recommendations, and adjustments to recommendation strength can be made based on the results of the poll.

In yet another embodiment, user 102 credibility is measured, for example via a feedback mechanism, so that recommendations submitted by users 102 having higher levels of credibility are given greater strength than other recommendations. The reliability of an average recommendation strength can also be adjusted based on statistical analysis, for example based on measurement variance of recommendation strengths for a given secondary question.

In one embodiment, the recommendation strengths are stored in the database 105 along with the secondary questions themselves.

In one embodiment, users 102 are encouraged to submit secondary questions and/or recommendations, for example by being granted rewards or perquisites for submitting them.

Once users 102 have posted 202 secondary questions, the advice-seeker 101 can return to the website to answer 204 the secondary questions. The advice-seeker 101 can also indicate the relative significance value of each answer, for example on a numeric scale; the significance value indicates how important the advice-seeker 101 perceives the secondary question to be, in relation to the decision question.

In one embodiment, the advice-seeker 101 can view responses submitted by others to the secondary questions, and/or can see an aggregated or average value based on responses of a group of users 102.

If more than one user 102 submitted recommendations for the same secondary question, the advice-seeker 101 can view the recommendations submitted by each, and can select one or more of the recommendations. If a single recommendation is selected, its strength as specified by the user 102 can be used in the determination of a score, although the advice-seeker 101 may modify the strength if desired. If more than one recommendation is selected, their strengths can be aggregated for use in the determination of a score. Alternatively, all of the relevant recommendations can be aggregated, for example by averaging. The advice-seeker 101 can also input his or her own indication of recommendation strength for the secondary questions.

For each secondary question answered by the advice-seeker 101, a score is generated 205 for one of the choices for the decision question. The score can be generated, for example, by multiplying the indicated recommendation strength (or an aggregation of recommendation strengths) by the indicated significance value of the answer. The advice-seeker 101 can also add his or her own secondary questions, along with answers, recommendation strengths, and significance values; these added secondary questions and associated data can be aggregated together with previously submitted secondary questions and associated data, during computation of the scores.

If a secondary question has more than two possible answers, for example if it involves a numeric assessment along a continuum or range, then the answer to the secondary question can be combined with the recommendation strength and relative significance value to derive a score.

Scores for the two (or more) choices for the decision question are totaled, and an overall recommendation is output 206.

Additional details will become apparent in the following description of exemplary embodiments.

Examples of Screens

Referring now to FIG. 3, there is shown an example of a screen 300 for selecting or posting a decision question, according to one embodiment. The screen 300 can be implemented, for example as a web page displayed on a browser 103. One skilled in the art will recognize that the particular layout, format, and design of the screen 300 as shown in FIG. 3 is merely exemplary, and that other configurations may be implemented without departing from the essential characteristics of the present invention as claimed herein. One skilled in the art will further recognize that the present invention can be implemented in other contexts and with other user interfaces than a web page.

The screen 300 includes a list 301 of previously posted decision questions. In one embodiment, the list 301 is scrollable, particularly if it is not practical to show all questions on the page. The list 301 can be tailored to particular known attributes or interests of the advice-seeker 101. Alternatively, a search field can be provided (not shown) allowing the advice-seeker 201 to search for particular questions or to filter the list 301. In one embodiment, the list 301 is organized by category (such as, for example "Sports"). A category can be explicitly named by the individual who posted the decision question, or it can be named by a moderator or other person, or it can be inferred from natural language processing or keyword processing.

If the advice-seeker 101 sees a decision question from the list 301 that he or she is interested in, he or she can click on it to initiate the process of answering secondary questions and obtaining a recommendation for the decision question. Alternatively, the advice-seeker can post a new decision question by entering text in the input fields 302, 303. Field 302 allows entry of initial text for the decision question, such as "Should I go to". Fields 303 allow entry of two choices associated with the decision question, for example "Stanford" and "UCSC". In other embodiments, more than two choices might be provided. It is helpful to provide a separate input field 303 for each choice. However, in other embodiments, the system of the present invention can parse text entered in a single input field, so as to extract the various components of the question for processing. Thus, the user might enter "Should I go to Stanford or UCSC?" and the system would determine that "Should I go to" is the preamble, and that "Stanford" and "UCSC" are the two choices. Such parsing can be performed, for example, according to well known natural language processing techniques.

Figure 3B:
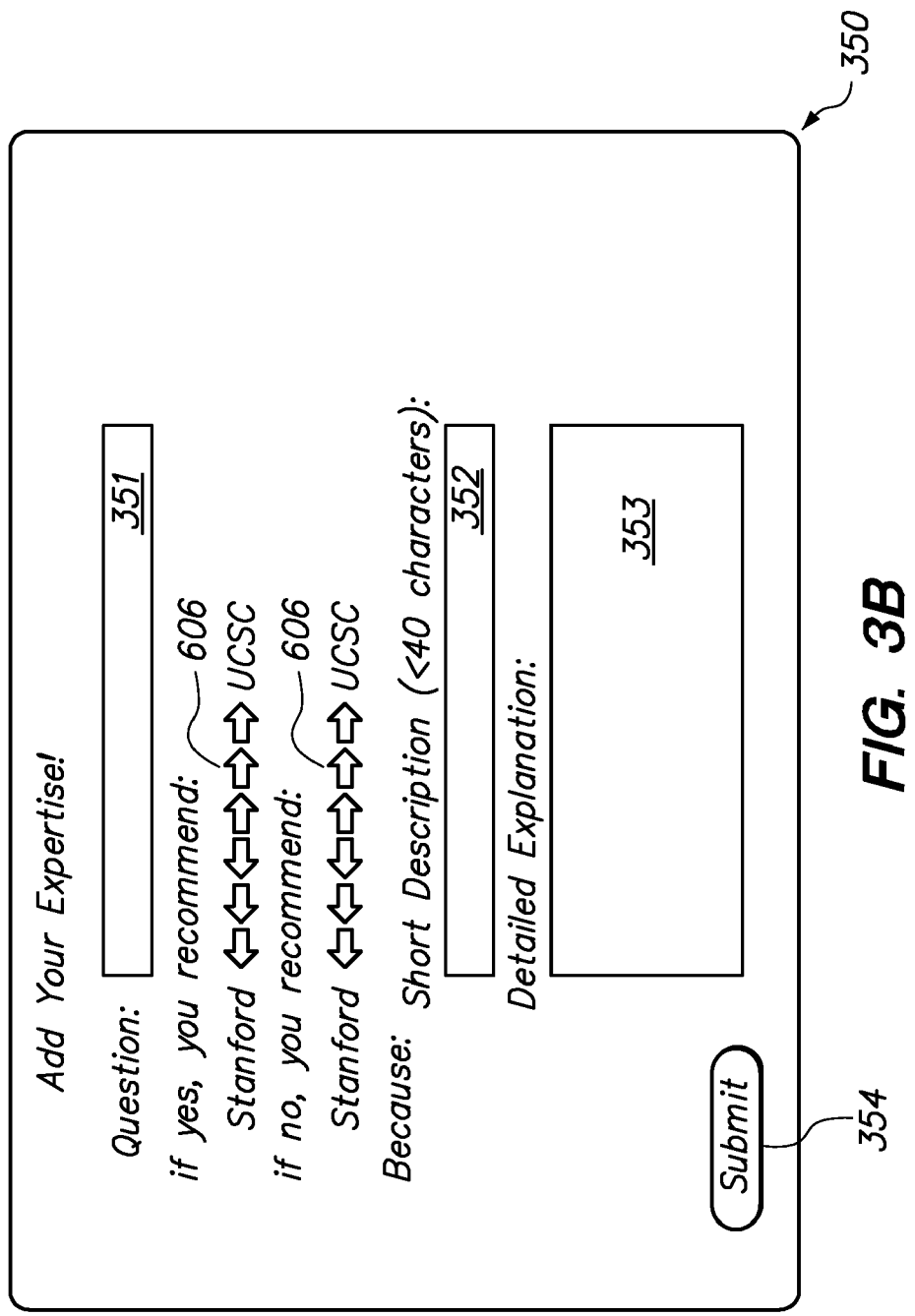
FIG. 3B depicts a sample layout for a screen for posting a secondary question and recommendation, according to one embodiment.

Referring now to FIG. 3B, there is shown an example of a screen 350 for posting a secondary question and recommendation, according to one embodiment. A user 102 can post a secondary question by typing the question in field 351. The user 102 can enter a recommendation by clicking on an arrow in one or both of the scales 606; in one embodiment, two scales 606 are provided, so that the user 102 can specify a recommendation for both an affirmative and a negative answer to the secondary question.

The user 102 can enter a short description in field 352 and a detailed explanation in field 353. The description and explanation are intended to provide a rationale for the recommendation given a particular answer to the secondary question.

The user can submit the secondary question, recommendation(s), description, and/or explanation by clicking on the Submit button 354.

Figure 4:
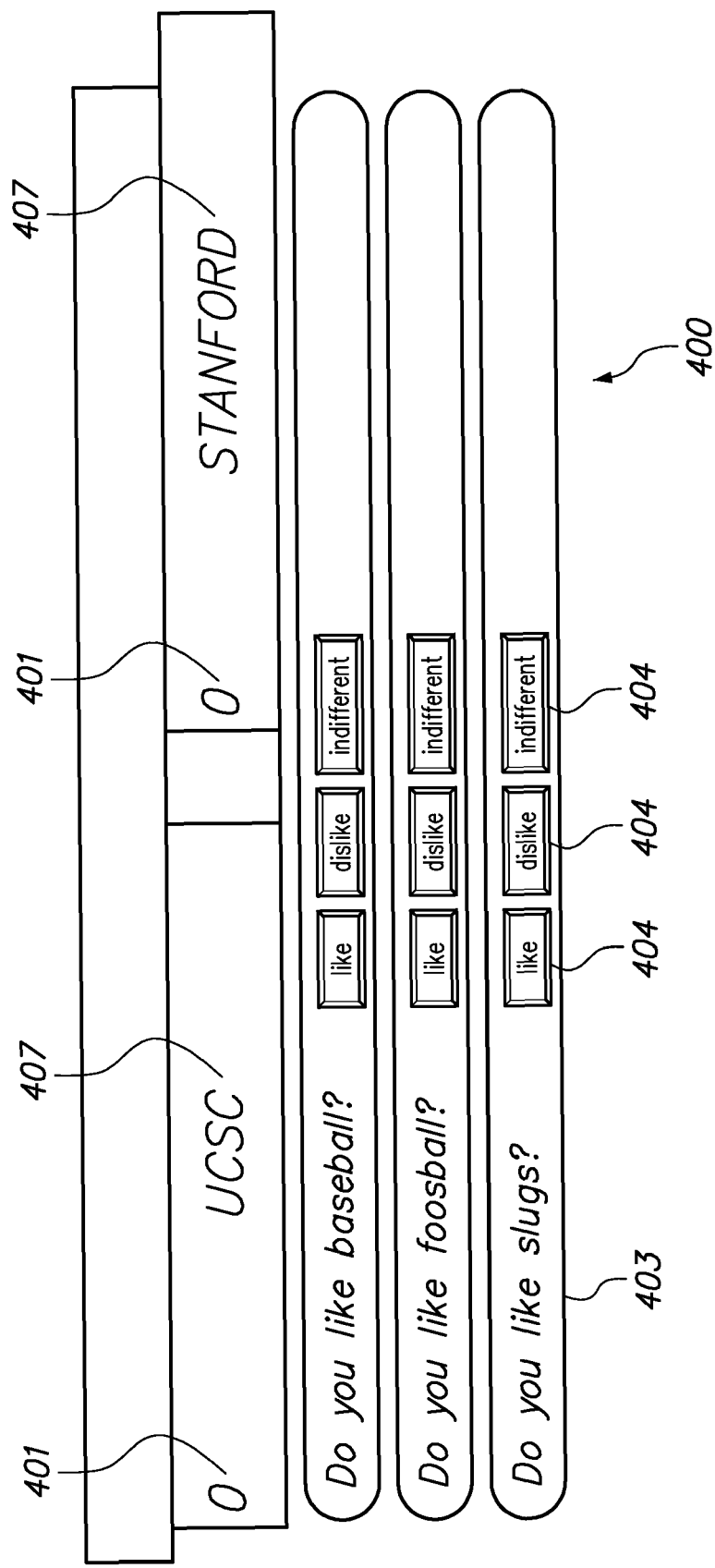
FIG. 4 depicts a sample layout for a screen for responding to secondary questions, according to one embodiment.

Referring now to FIG. 4, there is shown an example of a screen 400 for answering secondary questions 403, according to one embodiment. This screen 400 is displayed when the advice-seeker 101 wishes to answer secondary questions 403 and obtain a recommendation for the decision question.

The screen 400 shows both choices 407 for the decision question, along with a score 401 for each. A list of secondary questions 403 is also shown, along with buttons 404 for entering answers to the secondary questions 403. The user clicks on the buttons 404 to indicate an answer. In one embodiment, there are two or more possible answers for each secondary question 403. In one embodiment, secondary questions 403 need not be actual questions, but can be presented as factors that may affect the decision question. For instance, "skiing" could be presented as a "factor" with the implied question "Do you like skiing?" and an assumed affirmative answer "yes." The user then could specify how significant skiing is to him or her. For clarity of the following description, the term "secondary question" will be used; however, it will be understood that this term may apply to any item that provides an indication of a factor or element that may affect the decision question.

In one embodiment, the list of secondary questions 403 is organized by category (such as, for example "Sports"). A category can be explicitly named by the individual who posted the secondary question 403, or it can be named by a moderator or other person, or it can be inferred via natural language processing or keyword processing.

As the advice-seeker 101 answers the secondary questions 403 by clicking on the buttons 404, the system of the present invention determines what effect each answer should have on the scores 401, and the displayed scores 401 are updated accordingly.

In one embodiment, the effect of each answer on the scores 401 is based on the recommendation previously provided by the user 102 that submitted the secondary question 403 (and/or by other recommendations provided by other users 102). As discussed above, a recommendation strength can be provided, which modifies the effect of the answer on the scores 401. Recommendation strength can also be inferred based on various factors, and/or it can be modified by other users 102 or even by the advice-seeker 101.

Figure 5:
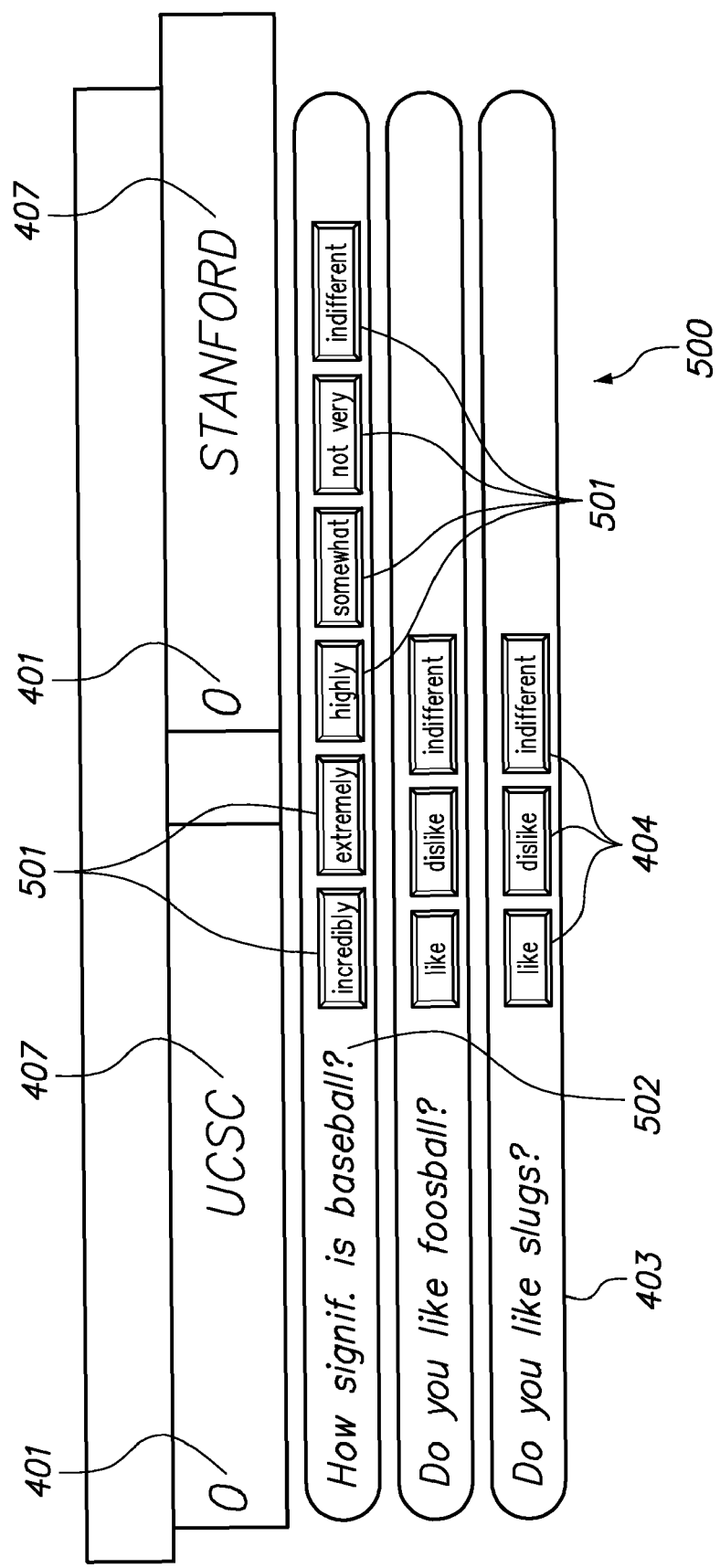
FIG. 5 depicts a sample layout for a screen for specifying a significance value for a secondary question, according to one embodiment.

In one embodiment, the advice-seeker 101 is given an opportunity to indicate a significance value for each answer to a secondary question 403, so as to specify how strongly he or she feels about that answer (or how important that factor or answer is to his or her decision). Referring now to FIG. 5, there is shown an example of a screen 500 for specifying a significance value to an answer to a secondary question 403. In one embodiment, this screen 500 is displayed after the advice-seeker 101 has answered a secondary question 403. In the example of FIG. 5, the advice-seeker 101 has answered the secondary question 403 relating to baseball, and is now presented with a prompt 502 asking him or her to provide a significance value for the indicated preference (or dislike) for baseball. In this example, the advice-seeker 101 is given six options, represented by buttons 501 ranging from "incredibly" to "indifferent". One skilled in the art will recognize that any number of options can be given. In one embodiment, these significance values are represented on a numeric scale, ranging for example from 0 to 5, where 0 would indicate that the secondary question 403 should have no bearing at all on the recommendation concerning the decision question, while a 5 would indicate that the advice-seeker 101 feels very strongly about the secondary question 403 and it should therefore have a maximum effect on the recommendation concerning the decision question. Alternatively, the buttons 501 may themselves indicate a numeric score, or some other quantitative indication of weight. In another embodiment, a slider control or other user interface element can be used in lieu of buttons.

In one embodiment, once the advice-seeker 101 clicks on a significance button 501, the display of the prompt 502 and buttons 501 is dismissed.

In one embodiment, an initial default significance can be inferred based on, for example, an average significance as selected by other advice-seekers 101. The advice-seeker 101 can modify the default significance as desired.

In one embodiment, secondary questions can be shown to the advice-seeker 101 in an order informed by the significance of each question to others' decisions.

Figure 7A:
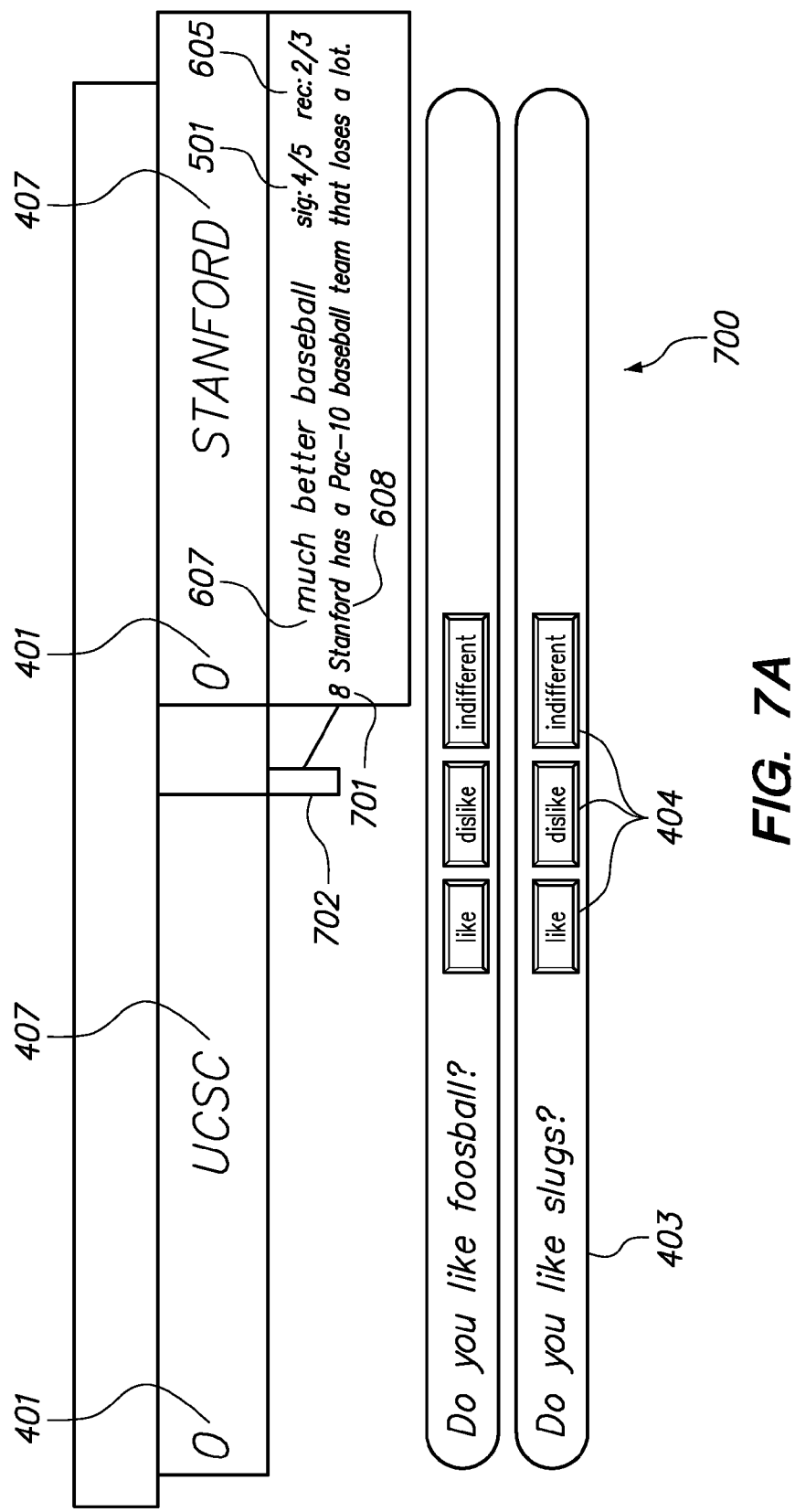
FIGS. 7A and 7B depict a sample layouts for a screen showing updated scores after a secondary question has been answered, according to one embodiment.

In one embodiment, the scores 401 are now updated, based on the advice-seeker's 101 answer to the secondary question 403 and indicated significance value 501, along with the previously provided strength of the recommendation for that secondary question 403. Referring now to FIG. 7A, there is shown an example of a screen 700 showing updated scores 401 after a secondary question 403 has been answered, according to one embodiment. In this example, the advice-seeker 101 has answered the baseball-related secondary question 403 in the affirmative, indicating that he or she likes baseball. The advice-seeker 101 has further indicated that baseball is extremely significant, by clicking on the "extremely" button 501 in screen 500. This translates to a significance value 501 of 4 out of 5. The recommendation strength 605 of the baseball question was previously given as a number value of 2.

The significance value and the recommendation strength are combined to arrive at a score 701 for that secondary question 403. In this example, the score 701 is derived by computing the product of the significance value and the recommendation strength, yielding a score of 4×2=8. One skilled in the art will recognize that other techniques can be used for deriving a score 701 based on the significance value and the recommendation strength. A short description 607 and detailed explanation 608 forming the basis for the score 701 are also shown, along with the significance value 501 and recommendation strength 605. The score 701 can be displayed numerically; other visual indications of score 701 can also be presented. For example, larger scores 701 can be shown in larger font size.

In the example of FIG. 7A, since no other secondary questions 403 have been answered yet, the score of 8 appears as the current total score 401 for Stanford, while UCSC shows a score 401 of 0.

In one embodiment, as shown in FIG. 7A, a bar 702 serves as a visual indicator of the score 701, with the width or length of the bar being proportional to the score 701. Other visual indicators can also be provided.

Figure 7B:
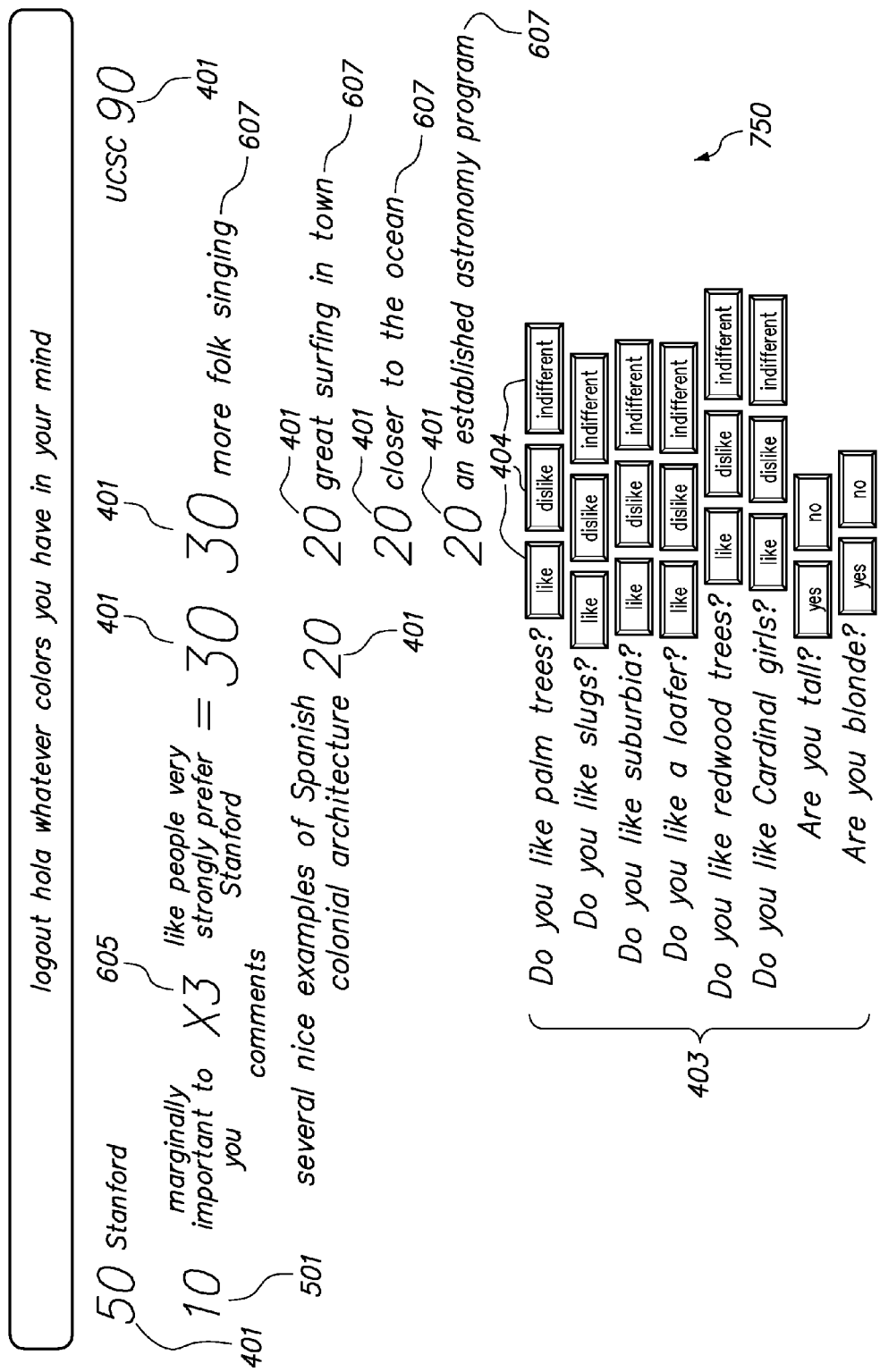

Referring now to FIG. 7B, there is shown another example of a screen 750 showing updated scores 401 after a secondary question 403 has been answered, according to one embodiment. Here, scores 401 and 701 are varied in size according to their magnitude. Also, screen 750 shows how a score 701 is derived, as the product of significance value 501 and recommendation strength 605.

Figure 6:
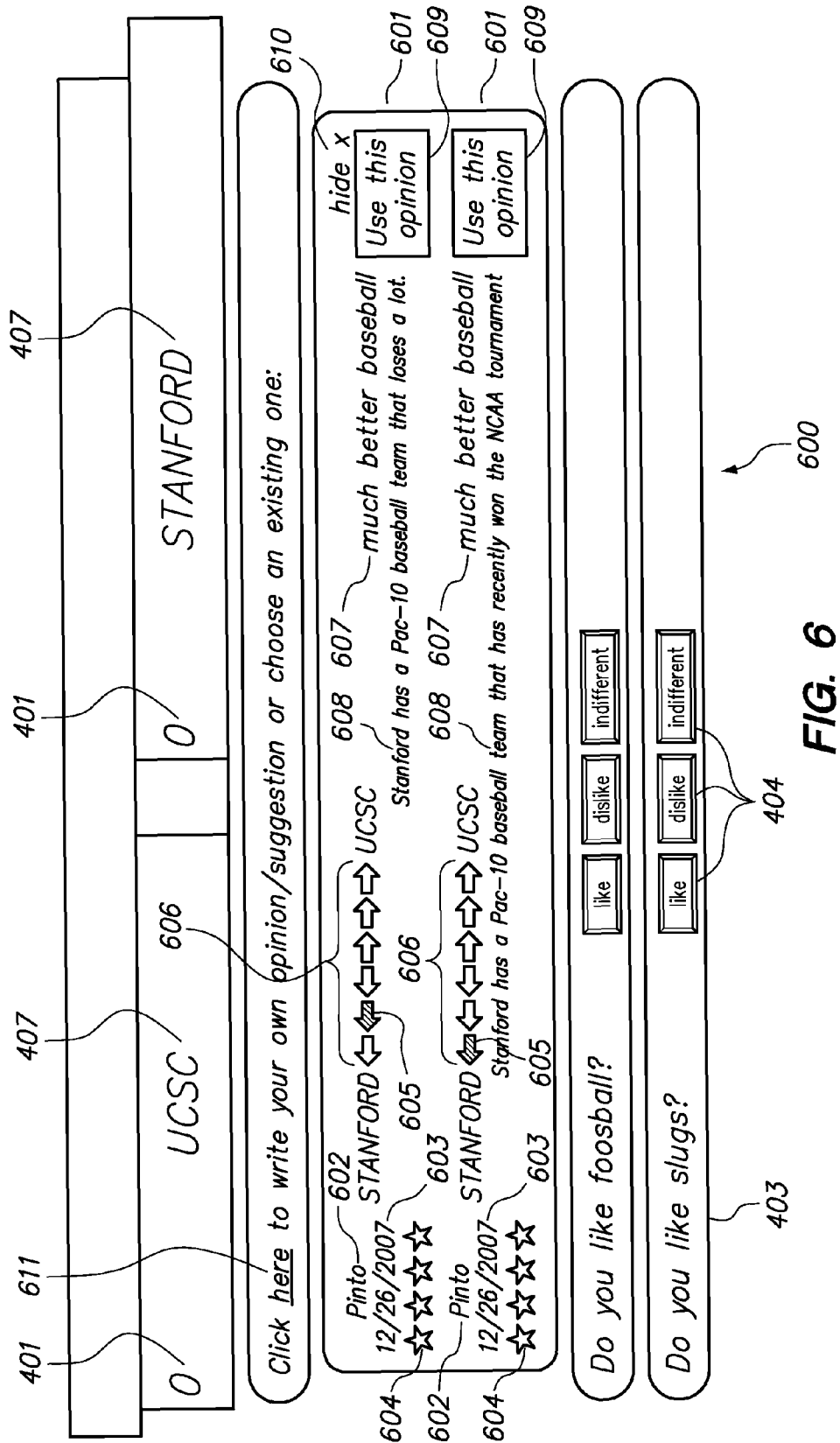
FIG. 6 depicts a sample layout for a screen for selecting among a plurality of recommendations associated with a secondary question, according to one embodiment.

In one embodiment, if a plurality of recommendations have been associated with a secondary question 403, the advice-seeker 101 is given an opportunity to view the recommendations and select one or more to apply to the decision-making process. Referring now to FIG. 6, there is shown an example of a screen 600 for selecting among a plurality of recommendations associated with a secondary question 403, according to one embodiment. In one embodiment, this screen would be shown prior to the display of the score 701 as depicting in screen 700.

In the example of FIG. 6, two recommendations 601 are shown for the secondary question 403 concerning baseball. For each recommendation 601, the following items are displayed:
- a name or other identifier 602, specifying the user 102 who submitted the recommendation 601;
- a rating 604 for the user 102 who submitted the recommendation 601, based for example on feedback of other users concerning the user 102 or the specific recommendation 601, or on the number of other users 102 that elected to use recommendations for the user 102;
- the date 603 that the recommendation 601 was posted;
- a recommendation strength 605, shown on a scale 606 running from a strong recommendation for one of the decision choices to a strong recommendation for the other decision choice;
- a short description 607 of the recommendation 601; and
- a detailed explanation 608 for the recommendation 601.

In the example, the recommendation strength 605 is shown on a visual scale 606, wherein each arrow corresponds to a numeric recommendation strength 605. One skilled in the art will recognize that other representations of the recommendation strength 605 can be shown.

In one embodiment, a hypertext link can be included, to provide access to website and other resources in support of the rationale 608 for the recommendation. The advice-seeker 101 or any other user can click on the hypertext link to view these supplementary resources.

The advice-seeker 101 can select any number of recommendations to be applied to the scores 401 by clicking on the "Use this opinion" button(s) 609. Clicking on one of the buttons 609 causes the corresponding recommendation to be applied. The advice-seeker 101 can also click on a link 611 to submit his or her own recommendation based on the secondary question 403.

Clicking on the "hide" button 610 causes the display of recommendations 601 to be dismissed and causes the scores 401 to be updated as shown in FIG. 7A.

In other embodiments, where a plurality of recommendations have been associated with a secondary question 403, the system of the present invention aggregates the recommendations to generate a score (for example by taking an average of the recommendation strengths), rather than presenting the recommendations to the advice-seeker 101 for selection.

In one embodiment, the advice-seeker 101 can see the recommendations 601 at any time, by for example clicking on a link, whether before or after inputting an answer to the corresponding secondary question and/or significance value.

Additional Variations

Figure 10:
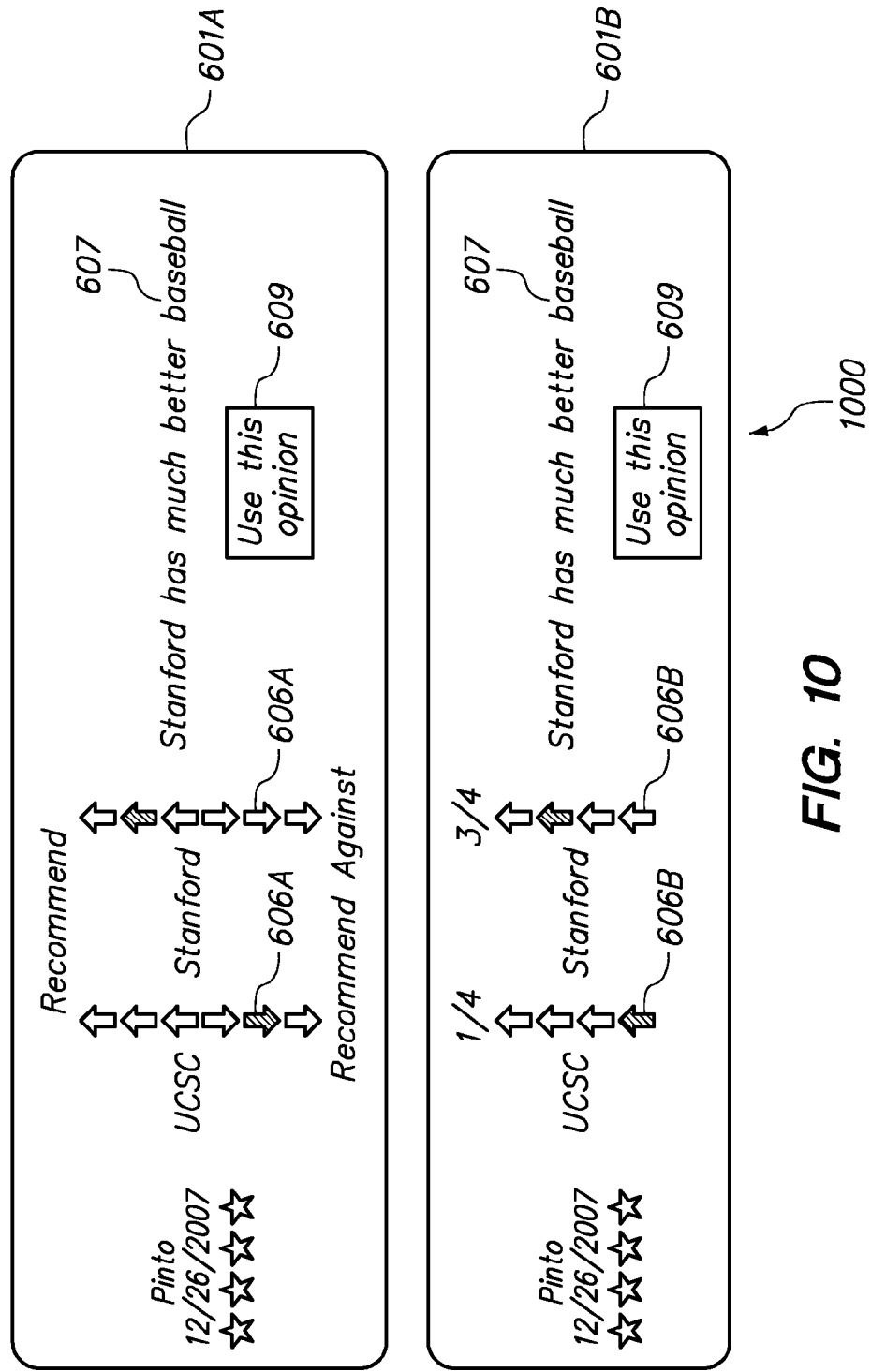
FIG. 10 depicts a sample layout for a screen for selecting an opinion where a choice is recommended for or recommended against based on an advice-seeker's answer to a secondary question, according to one embodiment.

In one embodiment, instead of explicitly recommending one or more choices over the others, a choice can be recommended for (or recommended against) based on the advice-seeker's 101 answer to a given secondary question. For instance, if the advice-seeker 101 indicates that he or she is interested in surfing, then UCSC could have a strong recommendation for while Beijing Normal would have a strong recommendation against. This allows for negative weights. In another embodiment, a recommend option is available but not a "recommend against" option, so that negative scores are not available. Referring now to FIG. 10, there is shown an example of a screen 1000 for such an embodiment. Two recommendations 601 are shown. In the first recommendation 601A, the user 102 has indicated, via scales 606A, that if baseball is significant, the user 102:
- recommends Stanford with a recommendation strength of 2 (on a scale of 1 to 3); and
- recommends against UCSC with a recommendation strength of 2 (on a scale of 1 to 3).

In the second recommendation 601B, the user 102 has indicated, via scales 606B, that if baseball is significant, the user 102:
- recommends Stanford with a recommendation strength of 3 (on a scale of 1 to 4); and
- recommends UCSC with a recommendation strength of 1 (on a scale of 1 to 4).

A short description 607 for each recommendation 601 is also shown as a rationale for the score. The advice-seeker can use one of the recommendations 601 by clicking on the "Use this opinion" button 609.

In one embodiment, each of the choices 407 for the decision question is associated with a price or cost that can be obtained automatically, such as from an online source (such as an external database or price search engine). If desired, any price differential among the choices 407 can be automatically added as a factor in generating a score 401. Thus, a score 401 can be adjusted upwards or downwards based on the difference in prices among the choices 407. The advice-seeker 101 can see the effect of the price-based adjustment, and can click a check-box or other interface element to turn on or off the price-based adjustment.

Secondary questions 403 can be presented in any desired order. In one embodiment, they may be presented in reverse chronological order, with the most recently posted questions 403 shown first. In another embodiment, an assessment can be made as to the likely relevance of each secondary question 403, with the questions 403 having the highest recommendation strength being shown first. In addition, the order that secondary questions 703 are shown to the advice-seeker 101 can depend on how many other advice-seekers selected each recommendation 403, as well as on the significance that other advice seekers 101 accorded to each secondary question 403.

In another embodiment, a ratings system is implemented for secondary questions. Users and advice-seekers can submit votes indicating their quality assessment of each secondary question, for example as a thumbs up/thumbs down entry. Secondary questions 403 can then be listed in a sequence according to their overall level of quality, with higher-quality questions being shown first. A quality level indicator can also be shown, for example as a star system or numeric indicator.

In yet another embodiment, secondary questions 403 posted by certain users that are known to have higher levels of credibility or quality are given display priority over other questions 403. One skilled in the art will recognize that any combination of the above ranking techniques and/or other ranking techniques can be used.

In one embodiment, transitive comparisons or multi-point decisions can be made. For example, existing decision questions "Should I go to Stanford or UC Santa Cruz?" and "Should I go to UC Santa Cruz or Beijing Normal University?," can be combined to form the question, "Should I go to Stanford or Beijing Normal University?" Secondary questions associated with the first two decision questions can be aggregated to a single set in relation to the third question. In creating the new question from the two existing questions, certain inferences can be made. Recommendations can be constructed transitively; for example, if Stanford is strongly recommended over UCSC for literature but UCSC strongly recommended over Beijing Normal, then Stanford can be very strongly recommended over Beijing Normal.

More subtle types of inference can also be made. Users 102 advising an advice-seeker generally attempt to help the advice-seeker by contributing secondary questions that are not toss-ups, so that they will contribute to a decision. Consequently, in general, for decision questions that have a significant number of secondary questions, issues on which the competing options share relative equality will not be contributed. This presumed equality can be used to inferring a transitive comparison. For example, a secondary question such as "Is good weather important to you?" might not be contributed as a secondary question for the decision question "Should I go to Stanford or UC Santa Cruz?" because they have similar climates. On the other hand, such a question would be more likely for the decision question "Should I go to UC Santa Cruz or Beijing Normal University?" because UCSC has a more moderate climate than Beijing. It could therefore be inferred that Stanford likely has better/more moderate weather. This fact could then be used to infer a synthetic recommendation.

Using these ways of inferring comparisons between choices using recommendations and shared secondary/responsive questions, one can create rankings on such qualities as weather. These rankings can be used to synthesize recommendations for other questions or they can be presented themselves.

The present invention can also be applied to sequences of decision questions, for example arranged in a logical structure such as a decision tree.

In one embodiment, postings by advice-seekers 101 and users 102 can be accompanied by clip-art, other images, or other media. For example, a baseball-related secondary question might be accompanied by a baseball-related image.

In one embodiment, the system of the present invention develops profiles of advice-seekers 101 over time. The profile may be developed, for example, by making inferences as to the preferences of advice-seekers 101 based on their answers to secondary questions. The profile can then be stored for future use; specifically, it can be used to provide default significance values for future secondary questions for that advice-seeker 101. In addition, it can be used to make suggestions based on selections made by other advice-seekers 101 or users 102 that have similar profiles. For example, if the advice-seeker 101 answers a secondary question indicating that he or she strongly prefers warm weather when picking a college, that preference can be stored in the profile of the advice-seeker 101. Subsequently, recommendations can be made to that advice-seeker 101 based on answers and decisions submitted by other advice-seekers 101 and users 102 that have also indicated a preference for warm weather. In addition, the profile can be used for recommending items for purchasing, marketing efforts, and selection of advertisements to present to the advice-seeker 101 or user 102. In addition, the profile can be used as a basis for making introductions to other advice-seekers 101 or users 102, for example in the context of a social network; users with similar profiles can be introduced to one another.

In one embodiment, an initial list of preset default secondary questions 403 may be provided for a decision question. The preset questions may be based, for example, on the category of the decision question (whether explicit or inferred). The preset questions may be presented, for example, when the decision question is posted. The advice-seeker 101, and possibly other users 102, can edit the list of preset questions, for example by deleting or modifying some of the questions. The changes can be used for the particular decision question only, or they can be saved for the next time the same list of preset questions is used.

In one embodiment, a moderator is able to view, edit, modify, and/or delete secondary questions as needed.

Three or More Choices

In one embodiment, the present invention provides alternative visual representations for decision questions or that involve three or more possible choices. For example, a triangle representation can be used for decision questions that have three choices.

Figure 8A:
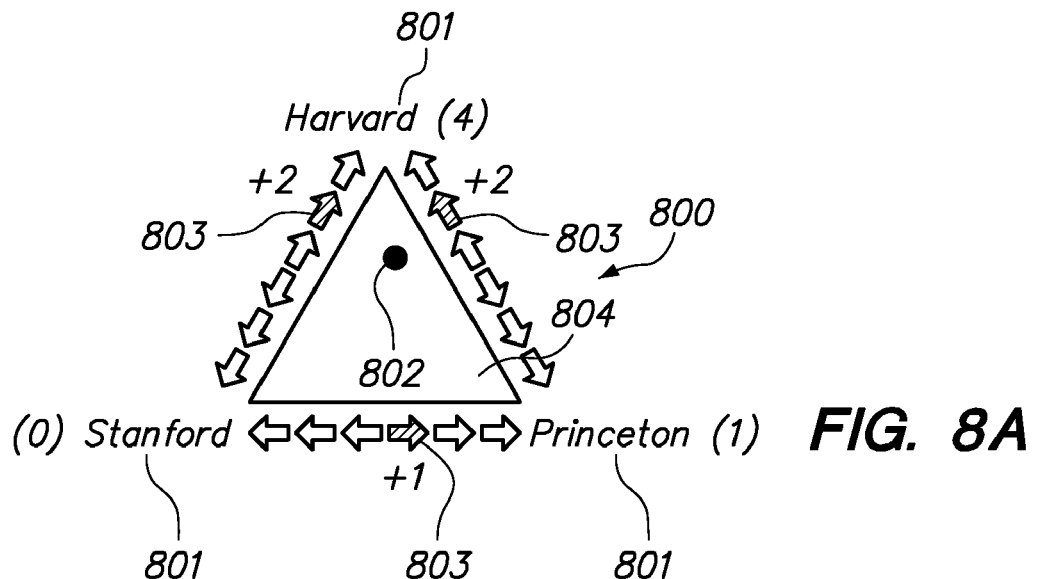
FIGS. 8A and 8B depict an example of an interface for inputting a recommendation for a secondary question where the decision question has three choices.
Figure 8B:
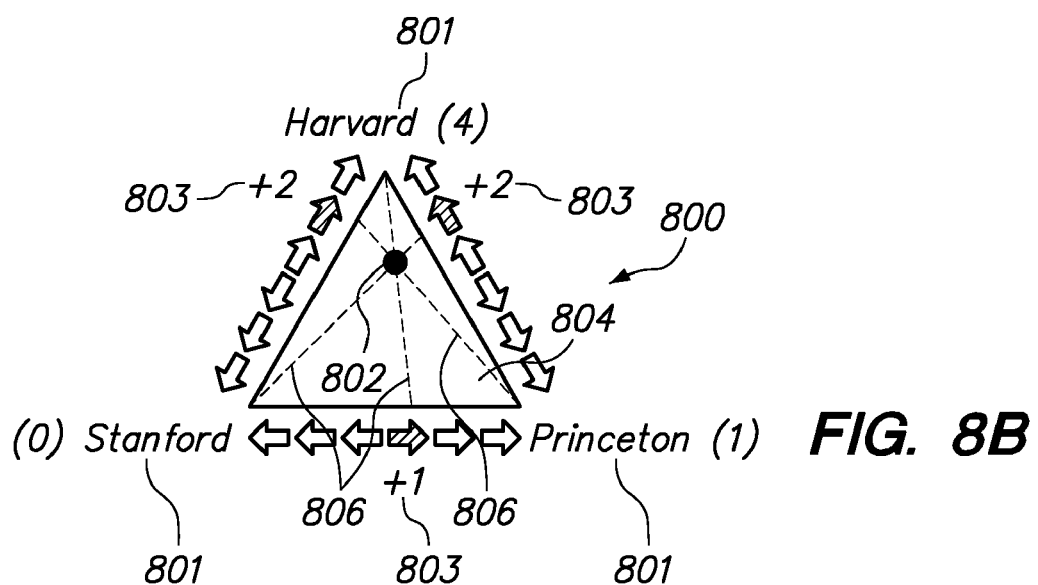

Referring now to FIGS. 8A and 8B, there is shown an example of an interface 800 for inputting a recommendation for a secondary question where the decision question has three choices. The user 102 selects a point 802 in an equilateral triangle 804 where each vertex 801 corresponds to one choice of the decision question. The selected point 802 specifies the recommendation as it relates to the three choices 801, and inherently specifies the strength of the recommendation as well. Specifically, the closer the point 802 is to one of the vertices 801, the stronger the recommendation for the corresponding choice of the decision question.

From the coordinates of the selected point 802 in the triangle 804, individual recommendation strengths can be ascertained with regard to each of the three comparisons that can be made between two choices. Thus, for the point 802 selected in the example of FIG. 8A, three lines 806 can be drawn as shown in FIG. 8B. Each line 806 extends from a vertex 801 to the opposing side of the triangle 804, with the line passing through the selected point 802. The point 802 at which the line 806 intersects the opposing side defines a recommendation strength between the two choices represented by vertices 801 connected by the opposing side.

Thus, in the example shown, the placement of the point 802 indicates that the secondary question corresponds to the following three recommendations:

recommendation of Harvard over Stanford, with strength 2;
a recommendation of Harvard over Princeton, with strength 2; and
a recommendation of Princeton over Stanford, with strength 1.

One way to interpret the recommendations would be to assign each choice the sum of its strength scores as listed above, whenever the secondary question is answered in the affirmative. Thus, Harvard would get 4 points, Princeton would get 1 point, and Stanford would get zero points. These point totals are shown in FIGS. 8A and 8B in parenthesis.

Another way to interpret a recommendation strength from the position of the point 802 is to perform a calculation where the strength equals 1/(distance from point 802 to relevant vertex 801). One skilled in the art will recognize that other mechanism may also be used for translating the positional information to recommendation strengths.

An advantage of such an arrangement is that, instead of having three independent recommendations (choice A vs. choice B, choice B vs. choice C, and choice A vs. choice C), there are now only two free parameters (an X and Y coordinate within the triangle). This forces the user to be consistent. If choice A is favored over choice B, and choice B is favored over choice C, then by implication choice A should be favored over choice C. Enforcing consistency among recommendations is not always appropriate but it has the benefit of reducing the number of choices the user must make to fully determine a system of recommendations.

The indicated recommendations and strengths can then be stored and applied according to techniques described above.

The analogous situation for four choices is a triangular pyramid with equilateral sides. For larger numbers of choices, there exist analogous shapes in higher dimensions.

Figure 9:
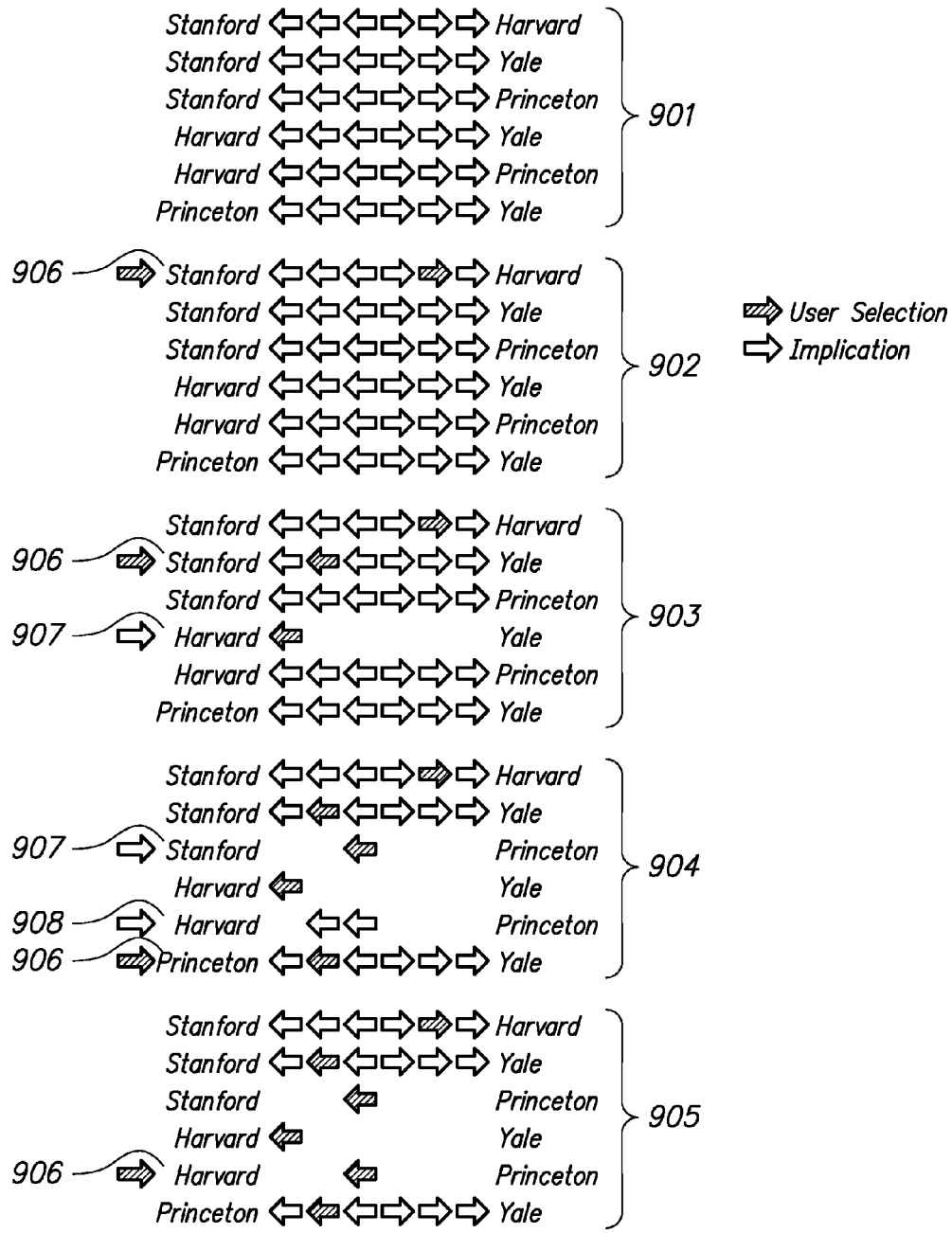
FIG. 9 depicts an example of a series of steps in specifying recommendations where the decision question has multiple choices.

In another embodiment, some recommendations can be inferred from user selections. This is particularly useful when multiple choices exist. Referring now to FIG. 9, there is shown an example of series of steps 901-905 in specifying recommendations where the decision question has multiple choices.

In the example, the decision question has four choices: Stanford, Harvard, Yale, and Princeton. Thus, six comparisons are available, each between two choices, as shown in step 901.

In step 901, the six comparisons are presented to the user 102 for the user 102 to make recommendations in connection with a secondary question.

In step 902, the user 102 has explicitly specified a recommendation 906 of Harvard over Stanford, with strength 2 (denoted by the second right-facing arrow). This means that, in the user's 102 opinion, an affirmative answer to the secondary question indicates a moderate-strength recommendation of Harvard over Stanford.

In step 903, the user has explicitly specified a recommendation 906 of Stanford over Yale with strength 2 (denoted by the second left-facing arrow). This means that, in the user's 102 opinion, an affirmative answer to the secondary question indicates a moderate-strength recommendation of Stanford over Yale. The two explicit recommendations, of Harvard over Stanford and Stanford over Yale, together imply that Harvard is strongly recommended over Yale. Accordingly, an inferred recommendation 907 is specified, for Harvard over Yale with strength 3. In one embodiment, as shown in FIG. 9, an inferred recommendation 907 causes other recommendation selections along the same row to be removed. In other embodiments, the other selections remain so as to allow the user 102 to override the inferred recommendation 907. In some cases, if the user 102 overrides an inferred recommendation 907, this may cause a conflict with a previous explicitly specified recommendation 906. If so, the previously previous explicitly specified recommendation 906 can be overridden automatically by a new inferred recommendation 907, or the user can be prompted to resolve the conflict.

In step 904, the user has explicitly specified a recommendation 906 of Princeton over Yale with strength 2 (denoted by the second left-facing arrow). An additional inferred recommendation 907 can now be added, namely Stanford over Princeton with strength 1. Also, an inference 908 can be made that only two selections remain for Harvard vs. Princeton, namely Harvard with strength 2 or Harvard with strength 3. Remaining selections are removed.

The user 102 can now choose one of the remaining selections for Harvard vs. Princeton. In step 905, the user 102 has selected a recommendation 906 of Harvard with strength 1.

The various recommendations, both explicit 906 and inferred 907, can then be stored as a set of scoring values for the four choices. In one embodiment, as described above for the triangular case, each choice is assigned the sum of its strength scores as shown in step 905, whenever the secondary question is answered in the affirmative. Thus, Harvard would get 2 points, Princeton would get 1 point, Stanford would get 3 points, and Yale would get 0 points.

The methodology of the present invention thus enforces consistency among selections when more than two choices are presented.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of generating a score for a decision question comprising:
   receiving, from a first user, via an input device, a decision question comprising at least two choices;
   subsequently to receiving the decision question, presenting the decision question to at least one second user;
   subsequently to presenting the decision question, receiving:
      at least one secondary question; and
      for each secondary question, at least one recommendation of at least one of the choices of the decision question, the recommendation specifying a relationship between the secondary question and the recommended choice of the decision question;
   storing the received at least one secondary question and the received at least one recommendation;
   presenting the at least one secondary question to the first user;
   subsequently to presenting the at least one secondary question to the first user, receiving, from the first user, answers to at least a subset of the at least one secondary question;
   for each received answer, determining a score for at least one of the choices for the decision question, the score being based on the received answer and on at least one recommendation associated with the secondary question;
   subsequently to determining a score for each received answer, aggregating the determined scores; and
   subsequently to aggregating the determined scores, outputting an indication of the aggregated scores.

2. The method of claim 1, wherein:
   receiving the at least one secondary question and the at least one recommendation comprises receiving at least one secondary question and at least one recommendation from the at least one second user.

3. The method of claim 1, wherein:
   receiving the at least one secondary question and the at least one recommendation comprises receiving at least one secondary question and at least one recommendation from the first user.

4. The method of claim 1, further comprising, for at least a subset of the received answers, receiving, from the first user, a significance value of the received answer;
   and wherein determining a score comprises determining a score based on the received answer, the received significance value, and at least one recommendation associated with the secondary question.

5. The method of claim 1, wherein presenting the decision question to at least one second user comprises posting the decision question at a website, and wherein receiving the at least one secondary question and recommendation comprises receiving the at least one secondary question and recommendation via the website.

6. The method of claim 1, wherein presenting the decision question to at least one second user comprises:
   receiving a list of users from whom advice is sought;
   inviting users on the list to contribute advice;
   and wherein:
   receiving at least one secondary question comprises receiving at least one secondary question from at least one user on the list; and
   receiving at least one recommendation of at least one of the choices of the decision question comprises receiving at least one recommendation from at least one user on the list.

7. The method of claim 1, wherein presenting the decision question to at least one second user comprises:
   receiving a list of users from whom advice is sought;
   making the decision question available to users on the list;
   and wherein:
   receiving at least one secondary question comprises receiving at least one secondary question from at least one user on the list; and
   receiving at least one recommendation of at least one of the choices of the decision question comprises receiving at least one recommendation from at least one user on the list.

8. The method of claim 1, further comprising, for at least a subset of the received recommendations, receiving a recommendation strength;
and wherein determining a score comprises determining a score based on the received answer and at least one recommendation and recommendation strength associated with the secondary question.

9. The method of claim 2, further comprising:
for at least a subset of the received recommendations, receiving a recommendation strength from the at least one second user; and
for at least a subset of the received answers, receiving, from the first user, a significance value of the received answer;
and wherein determining a score comprises determining a score based on the received answer, the received significance value, and at least one recommendation and recommendation strength associated with the secondary question.

10. The method of claim 9, wherein the recommendation strength comprises a numeric value and the significance value comprises a numeric value, and wherein determining a score comprises multiplying the recommendation strength by the significance value.

11. The method of claim 1, further comprising, subsequently to aggregating the determined scores:
generating an overall recommendation for the decision question based on the aggregated scores; and
outputting the overall recommendation.

12. A method of generating a score for a decision question comprising:
presenting a decision question comprising exactly three choices;
receiving at least one secondary question;
for each secondary question, receiving at least one recommendation of at least one of the choices of the decision question;
storing the at least one secondary question and the at least one recommendation;
presenting the at least one secondary question;
receiving input comprising answers to at least a subset of the at least one secondary question;
for each received answer, determining a score for at least one of the choices for the decision question, the score being based on the received answer and on at least one recommendation associated with the secondary question;
aggregating the determined scores; and
outputting an indication of the aggregated scores;
wherein receiving at least one recommendation of at least one of the choices of the decision question comprises:
presenting a triangle comprising three vertices, wherein each vertex corresponds to a choice;
receiving input indicating a location within the triangle; and
determining a recommendation for at least one of the choices based on relative proximity of the indicated location with respect to each of the vertices of the triangle.

13. The method of claim 12, further comprising determining a recommendation strength for at least one of the determined recommendations, based on a relative proximity of the indicated location with respect to each of the vertices of the triangle.

14. The method of claim 1, further comprising, based on at least two received recommendations of choices of the decision question, inferring at least one other recommendation of a choice of the decision question.

15. The method of claim 2, wherein for at least one secondary question, receiving at least one recommendation comprises receiving at least two recommendations, the method further comprising:
outputting the at least two recommendations; and
receiving, from the at least one second user, a selection of at least one of the recommendations;
and wherein determining the score comprises determining the score based on the received answer and on the selected at least one recommendation.

16. The method of claim 1, further comprising generating at least one additional secondary question based on at least two received secondary questions.

17. A method of generating a score for a decision question comprising:
receiving, from a first user, via an input device, a decision question comprising at least two choices;
subsequently to receiving the decision question, presenting the decision question to at least one second user;
subsequently to presenting the decision question, receiving:
at least one secondary question; and
for each secondary question, at least one rating for at least one of the choices of the decision question, the rating specifying a relationship between the secondary question and the recommended choice of the decision question;
storing the received at least one secondary question and the received at least one rating;
subsequently to storing the at least one secondary question and the at least one rating, presenting the at least one secondary question to the first user;
subsequently to presenting the at least one secondary question to the first user, receiving, from the first user, answers to at least a subset of the at least one secondary question;
for each received answer, determining a score for at least one of the choices for the decision question, the score being based on the received answer and on at least one rating associated with the secondary question;
subsequently to determining a score for each received answer, aggregating the determined scores; and
subsequently to aggregating the determined scores, outputting an indication of the aggregated scores.

18. A method of generating a score for a decision question comprising:
receiving, from a first user, via an input device, a decision question comprising at least two choices;
subsequently to receiving the decision question, presenting the decision question to at least one second user;
subsequently to presenting the decision question, receiving:
at least one factor; and
for each factor, at least one recommendation of at least one of the choices of the decision question, the recommendation specifying a relationship between the factor and the recommended choice of the decision question;
storing the received at least one factor and the received at least one recommendation;
subsequently to storing the at least one factor and the at least one recommendation, presenting the at least one factor to the first user;
subsequently to presenting the at least one factor to the first user, receiving, from the first user, responses to at least a subset of the at least one factor;

for each received response, determining a score for at least one of the choices for the decision question, the score being based on the received response and on at least one recommendation associated with the factor;

subsequently to determining a score for each received response, aggregating the determined scores; and subsequently to aggregating the determined scores, outputting an indication of the aggregated scores.

19. A computer program product for generating a score for a decision question comprising:

a non-transitory computer-readable storage medium; and computer program code, encoded on the medium, programmatically configured to cause at least one processor to perform the steps of:

receiving, from a first user, via an input device, a decision question comprising at least two choices;

subsequently to receiving the decision question, presenting the decision question to at least one second user;

subsequently to presenting the decision question, receiving:

at least one secondary question; and for each secondary question, at least one recommendation of at least one of the choices of the decision question, the recommendation specifying a relationship between the secondary question and the recommended choice of the decision question;

storing the received at least one secondary question and the received at least one recommendation;

presenting the at least one secondary question to the first user;

subsequently to presenting the at least one secondary question to the first user, receiving, from the first user, answers to at least a subset of the at least one secondary question;

for each received answer, determining a score for at least one of the choices for the decision question, the score being based on the received answer and on at least one recommendation associated with the secondary question;

subsequently to determining a score for each received answer, aggregating the determined scores; and subsequently to aggregating the determined scores, outputting an indication of the aggregated scores.

20. The computer program product of claim 19, further comprising computer program code, encoded on the medium, programmatically configured to cause at least one processor to perform the steps of:

for at least a subset of the received recommendations, receiving a recommendation strength; and for at least a subset of the received answers, receiving, from the first user, a significance value of the received answer;

and wherein the computer program code programmatically configured to perform the step of determining a score comprises computer program code programmatically configured to determine a score based on the received answer, the received significance value, and at least one recommendation and recommendation strength associated with the secondary question.

21. The computer program product of claim 19, further comprising computer program code, encoded on the medium, programmatically configured to cause at least one processor to perform the steps of, subsequently to aggregating the determined scores:

generating an overall recommendation for the decision question based on the aggregated scores; and outputting the overall recommendation.

22. A system for generating a score for a decision question comprising:

a first input device, configured to receive, from a first user, a decision question comprising at least two choices;

a first output device, configured to present the decision question to at least one second user subsequently to the first input device receiving the decision question;

a second input device, configured to receive:

at least one secondary question; and for each secondary question, at least one recommendation of at least one of the choices of the decision question, the recommendation specifying a relationship between the secondary question and the recommended choice of the decision question;

a storage device, configured to store the received at least one secondary question and the received at least one recommendation;

a second output device, configured to present the at least one secondary question to the first user;

wherein the first input device is further configured to receive, from the first user, answers to at least a subset of the at least one secondary question, subsequently to the second output device presenting the at least one secondary question to the first user;

the system further comprising:

a scoring module, configured to, for each received answer, determine a score for at least one of the choices for the decision question, the score being based on the received answer and on at least one recommendation associated with the secondary question; and an aggregator, configured to aggregate the determined scores subsequently to the scoring module determining a score for each received answer;

wherein the first output device is further configured to output an indication of the aggregated scores subsequently to the aggregator aggregating the determined scores.

23. The system of claim 22, wherein at least one of the input devices is further configured to receive:

for at least a subset of the received recommendations, a recommendation strength; and for at least a subset of the received answers, a significance value of the received answer;

and wherein the scoring module is further configured to determine a score based on the received answer, the received significance value, and at least one recommendation and recommendation strength associated with the secondary question.

24. The system of claim 22, wherein:

the scoring module is further configured to generate an overall recommendation for the decision question based on the aggregated scores; and the first output device is further configured to output the overall recommendation.

25. The method of claim 17, wherein:

receiving the at least one secondary question and the at least one rating comprises receiving at least one secondary question and at least one rating from the at least one second user.

26. The method of claim 18, wherein:

receiving the at least one factor and the at least one recommendation comprises receiving at least one factor and at least one recommendation from the at least one second user.

27. The computer program product of claim 19, wherein:
receiving the at least one secondary question and the at least one recommendation comprises receiving at least one secondary question and at least one recommendation from the at least one second user.

28. The system of claim 22, wherein:
the second input device is configured to receive the at least one secondary question and the at least one recommendation from the at least one second user.

* * * * *